United States Patent
Nakata et al.

(10) Patent No.: US 9,978,421 B1
(45) Date of Patent: May 22, 2018

(54) OPTICAL DISK DEVICE AND LARGE-SCALE OPTICAL DISK DEVICE

(71) Applicant: Panasonic Intellectual Property Management Co., Ltd., Osaka (JP)

(72) Inventors: Kohei Nakata, Nara (JP); Yoshihisa Takahashi, Osaka (JP); Junichi Minamino, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days. days.

(21) Appl. No.: 15/784,142

(22) Filed: Oct. 15, 2017

(30) Foreign Application Priority Data

Nov. 21, 2016 (JP) ................................ 2016-225646

(51) Int. Cl.
  *G11B 20/18* (2006.01)
  *G11B 7/24088* (2013.01)
  *G11B 20/00* (2006.01)

(52) U.S. Cl.
  CPC ...... *G11B 20/1883* (2013.01); *G11B 7/24088* (2013.01); *G11B 20/00586* (2013.01)

(58) Field of Classification Search
  CPC ... G11B 20/1883; G11B 2220/20; G11B 7/00; G11B 19/04; G11B 27/36; G11B 20/18; G11B 20/10009
  USPC ......... 369/47.14, 52.1, 53.12, 53, 15, 53.17, 369/53.35, 53.42
  See application file for complete search history.

(56) References Cited

U.S. PATENT DOCUMENTS

| | | | |
|---|---|---|---|
| 6,310,739 B1 * | 10/2001 | McEwen | G01R 33/1207 360/25 |
| 2004/0258400 A1 | 12/2004 | Yamaoka et al. | |
| 2006/0156180 A1 | 7/2006 | Kang | |
| 2010/0067339 A1 | 3/2010 | Kaida et al. | |
| 2010/0232276 A1 | 9/2010 | Takahashi et al. | |

FOREIGN PATENT DOCUMENTS

| | | |
|---|---|---|
| JP | 2006-164503 A | 6/2006 |
| WO | WO 2003/041074 A1 | 5/2003 |
| WO | WO 2007/114118 A1 | 10/2007 |
| WO | WO 2008/056681 A1 | 5/2008 |

* cited by examiner

*Primary Examiner* — Nabil Hindi
(74) *Attorney, Agent, or Firm* — Renner Otto Boisselle & Sklar, LLP

(57) ABSTRACT

The optical disk device performs recording/reproducing of data by a predetermined recording block on the track of an optical disk. The device has a recording unit, an optical-head, and a failure detection unit. The recording unit generates a recording signal by modulating the data. The optical-head records data on the track by optical beam emission to the track according to the recording signal, and detects light reflected off the track and then generates a detection signal based on the reflected light. The failure detection unit detects an abnormal condition based on the detection signal changed from a normal condition. If the sum of duration of an abnormal condition in the recording block is equal to or greater than a first time-length, the failure detection unit determines that the recording block has a flaw.

11 Claims, 6 Drawing Sheets

FIG. 6

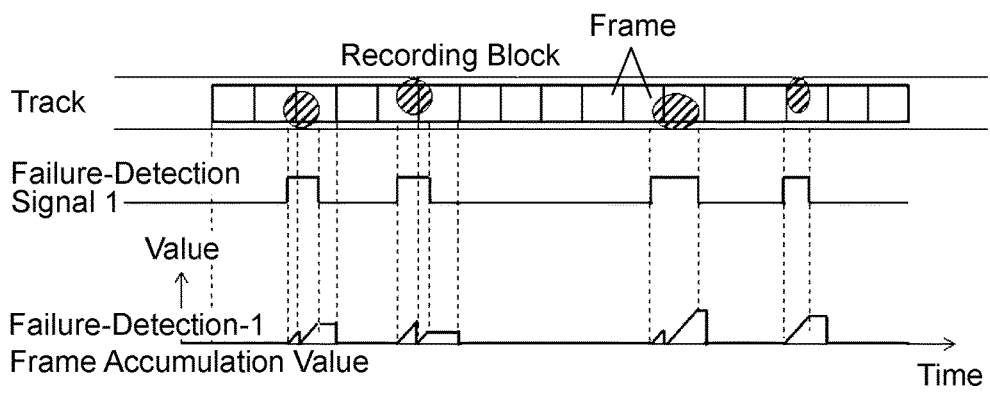

| Memory Address | +0byte | +1byte | +2byte | +3byte |
|---|---|---|---|---|
| 0x0000 | Failure Detection 1 Frame 0 Accumulation Value | Failure Detection 2 Frame 0 Accumulation Value | Failure Detection 3 Frame 0 Accumulation Value | Failure Detection 4 Frame 0 Accumulation Value |
| 0x0004 | Failure Detection 1 Frame 1 Accumulation Value | Failure Detection 2 Frame 1 Accumulation Value | Failure Detection 3 Frame 1 Accumulation Value | Failure Detection 4 Frame 1 Accumulation Value |
| 0x0008 | Failure Detection 1 Frame 2 Accumulation Value | Failure Detection 2 Frame 2 Accumulation Value | Failure Detection 3 Frame 2 Accumulation Value | Failure Detection 4 Frame 2 Accumulation Value |
| 0x000C | Failure Detection 1 Frame 3 Accumulation Value | Failure Detection 2 Frame 3 Accumulation Value | Failure Detection 3 Frame 3 Accumulation Value | Failure Detection 4 Frame 3 Accumulation Value |
| 0x0010 | Failure Detection 1 Frame 4 Accumulation Value | Failure Detection 2 Frame 4 Accumulation Value | Failure Detection 3 Frame 4 Accumulation Value | Failure Detection 4 Frame 4 Accumulation Value |

OPTICAL DISK DEVICE AND LARGE-SCALE OPTICAL DISK DEVICE

BACKGROUND

1. Technical Field

The present disclosure relates to an optical disk device that performs data-recording and data-reproducing on an optical disk.

2. Description of the Related Art

Currently, various types of optical disks, such as a digital versatile disc (DVD) and a Blu-ray (registered trademark) disc (hereinafter, referred to a BD), are widely used as a data recording medium for storing data including video. When data needs to be stored in such an optical disk for years, a poor storage condition can cause defectiveness due to a scratch or dust on a disk, by which data-reproducing sometimes fails. To establish reliability of long-term data storage in various storage conditions, the number of errors in data is checked by reproducing the data immediately after data-recording operation. During the storage period, the data undergoes the similar checking by a periodical data-reproducing operation that is separately performed from a data access request.

According to the description on the structure disclosed in Patent Literature 1, an ECC (error collection code) block structure enables error correction within a predetermined area so as to provide a certain area of data stored in an optical disk with reliability. A threshold value is defined in advance based on the correctable number of errors, and failure detection beyond the threshold value is regarded as a target for a defect management process.

CITATION LIST

Patent Literature

PTL 1: WO2003/041074

SUMMARY

Technical Problem

The present disclosure provides an optical disk device capable of detecting a flaw, such as a scratch and dust on an optical disk, while performing data-recording/reproducing. In the failure detection above, the device has no need for performing data-reproducing operation—except for data access request—to check the number of errors.

Solution to Problem

The optical disk device according to an aspect of the present disclosure performs recording/reproducing of data on the track of an optical disk by a predetermined recording block. The device has a recording unit, an optical-head, and a failure detection unit. The recording unit generates a recording signal by modulating the data. The optical-head records data on the track by optical beam emission to the track according to the recording signal, and detects light reflected off the track and then generates a detection signal based on the reflected light. The failure detection unit detects an abnormal condition based on the detection signal changed from a normal condition. If the sum of duration of an abnormal condition in the recording block is equal to or greater than the first time-length, the failure detection unit determines that the recording block has a flaw.

The recording block may be formed of a plurality of frames. The failure detection unit may calculate the sum of duration of an abnormal condition in each of the frames. The optical disk device may have the failure detection memory that sequentially stores the sum of duration of the abnormal condition by frames, tracking back from the current position over a period of the past more-than-one turn of the track.

A large-scale optical disk device according to further aspect of the present disclosure has a plurality of optical disk devices described above. The large-scale optical disk device has a control unit to control the plurality of optical disk devices and an organizing unit to store the result detected by the failure detection unit and the failure detection memory of each of optical disk devices. For example, suppose that the failure detection unit of a first optical disk device determines that the currently processing recording block has a flaw. At that time, when the detection result retained by the organizing unit shows that the second optical disk device is less defective than the first optical disk device, the data of the flaw-detected processing recording block may be moved to the second optical disk device.

Advantageous Effect of Invention

The optical disk device of the present disclosure estimates the total number of errors due to a flaw during the data-recording operation, with no reproducing data for check immediately after recording the data. Further, in the data-reproducing operation, the optical disk device detects a flaw on an optical disk before serious increase in the number of errors.

BRIEF DESCRIPTION OF THE DRAWINGS

FIG. 6 illustrates how the failure detection memory retains failure-detection frame accumulation values.

DETAILED DESCRIPTION

Hereinafter, an exemplary embodiment will be described in detail, with reference to the accompanying drawings. However, details beyond necessity (for, example, descriptions on well-known matters or on substantially identical structures) may be omitted to eliminate redundancy from the description below for easy understanding of those skilled in the art.

It is to be understood that the inventor(s) provides the accompanying drawings and the description below for purposes of full understanding of those skilled in the art and they are not to be construed as limitation on the scope of the claimed disclosure.

First Exemplary Embodiment

Hereinafter, the structure of the exemplary embodiment will be described with reference to FIG. 1 through FIG. 6.

1-1. Structure

Figure 1:
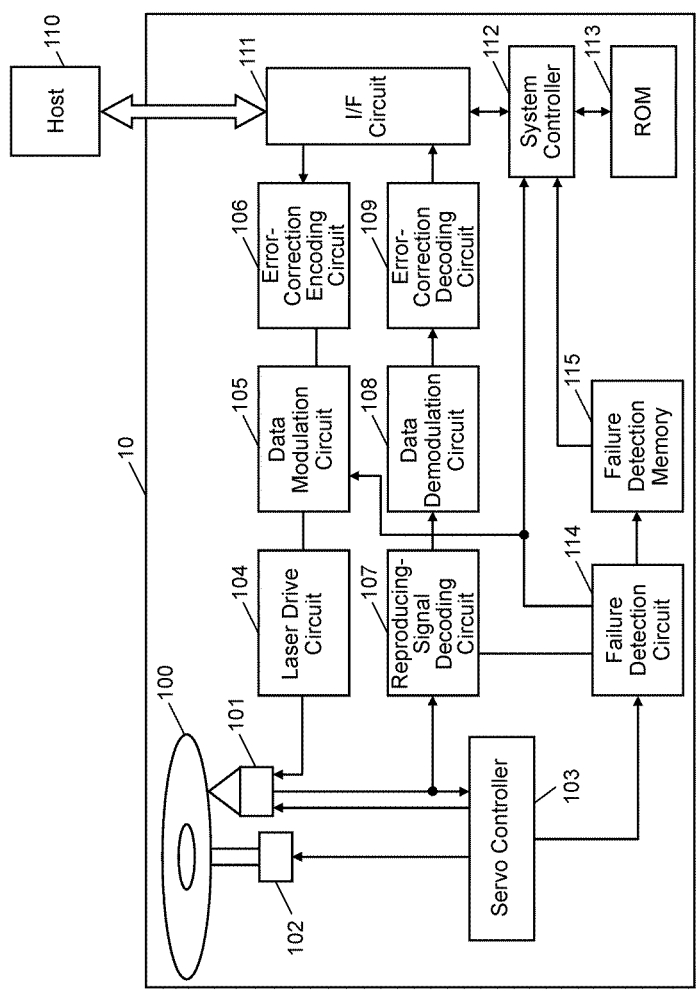
FIG. 1 is a block diagram showing a structure of the optical disk device of the exemplary embodiment.

FIG. 1 is a block diagram showing the structure of optical disk device 10 of the exemplary embodiment. As shown in FIG. 1, optical disk device 10 has optical head 101, spindle motor 102, servo controller 103, laser drive circuit 104, data modulation circuit 105, error-correction encoding circuit 106, reproducing-signal decoding circuit 107, data demodulation circuit 108, error-correction decoding circuit 109, system controller 112, interface circuit (hereinafter, I/F circuit) 111, ROM (Read Only Memory) 113, failure detection circuit 114, and failure detection memory 115.

In response to a recording/reproducing request from host device 110, optical disk device 10 records data onto optical disk 100 or reproduces data of optical disk 100. Optical disk 100 has a track, which is helically formed from the inner circumference to the outer circumference. The track is formed of a (groove-shaped) groove track and a land track formed between the neighboring track sections of the groove track. Data is recorded onto both of the groove track and the land track.

Spindle motor 102 rotates optical disk 100. Optical head 101 emits optical beams of laser light to record data onto optical disk 100 and to reproduce data of optical disk 100.

Servo controller 103 controls optical head 101 and spindle motor 102 so as to focus the optical beams emitted from optical head 101 onto optical disk 100 (focusing control) and so as to access to an intended track (tracking control). Servo controller 103 controls the position of optical head 101 and the rotation speed of spindle motor 102 so that optical head 101 scans optical disk 100 at a predetermined linear speed based on an optical detection signal from optical head 101.

I/F circuit 111 receives data, which is to be recorded on optical disk 100, from host device 110. Besides, I/F circuit 111 transfers reproduced data of optical disk 100 to host device 110.

Receiving data (to be recorded onto an optical disk) from host device 110 via IT circuit 111, error-correction encoding circuit 106 adds parity to the data for error correction.

Receiving the parity-added data from error-correction encoding circuit 106, data modulation circuit 105 modulates the data according to a predetermined modulation rule to produce a modulation signal. The modulation signal is recorded on the track of optical disk 100.

Laser drive circuit 104 converts the modulation signal into an optical pulse to accurately form a mark onto optical disk 100, and drives optical-beam output from optical head 101 based on an optical drive signal of the converted optical pulse. Optical-beam emission generates heat, which forms a mark on optical disk 100.

Such recorded data on optical disk 100 is reproduced by reproducing-signal decoding circuit 107, data demodulation circuit 108, and error-correction decoding circuit 109.

Optical head 101 emits optical beams to the track of optical disk 100 and detects the light reflected off optical disk 100. Optical head 101 produces an electric signal based on the detected reflected light and outputs it as a reproducing signal. Reproducing-signal decoding circuit 107 decodes the reproducing signal received from optical head 101 to produce a decoding signal. Specifically, reproducing-signal decoding circuit 107 produces a decoding signal by a PRML (Partial Response Maximum Likelihood) signal process. That is, reproducing-signal decoding circuit 107 makes comparison between the reproducing signal and an expectation-value waveform and selects the waveform whose shape is most similar to the reproducing signal. Reproducing-signal decoding circuit 107 outputs a binary signal, which is the base of the expectation-value waveform, as the decoding signal.

Besides, reproducing-signal decoding circuit 107 performs quality measurement of a reproducing signal, for example, distortion in a reproducing signal and variation in an amplitude. It employs an MLSE (Maximum Likelihood Sequential Error) index as an evaluation technique of signal quality that conforms with the PRML signal processing technique. The MLSE index is used for quantitative evaluation of error between a reproducing signal and an expectation-value waveform. Specifically, the MLSE index evaluates a focusing state of optical beams onto optical disk 100 and a recording state of a mark recorded on the track.

Data demodulation circuit 108 demodulates a demodulation signal according to a predetermined demodulation rule to obtain recording data.

Error-correction decoding circuit 109 provides the decoded recording data with error correction and correctly restores the recording data.

Read only memory (ROM) 113, which is formed of flash memory, stores programs by which system controller 112 controls the entire system of optical disk device 10.

Reading the programs stored in ROM 113 and executing them, system controller 112 controls the workings of each circuit and communication with host device 110. For the sake of convenience, FIG. 1 does not show an arrow that indicates a control-flow direction from system controller 112 to each component.

Failure detection circuit 114 monitors the value of each signal used for servo controller 103 and reproducing-signal decoding circuit 107 so as to detect a section where the value of each signal shows an abnormal state. For example, the followings are monitored by failure detection circuit 114: a focus-error signal (used for the focusing control) and a tracking-error signal (used for the tracking control) in serve controller 103; and an amplitude-detection signal and an offset-detection signal that are used for controlling the amplitude and the offset, respectively, of the reproducing signal in reproducing-signal decoding circuit 107. Under the normal condition, each of the signals above has a constant, appropriate value. However, if optical disk 100 has a flaw, such as a scratch or dust, and an optical beam passes an area having such a flaw, each signal has a change in value. As for each signal, a threshold level is defined. Failure detection circuit 114 generates a failure detection signal by detecting a section where any signal has a value that does not belong to the threshold level. Further, failure detection circuit 114 accumulates the duration of the output of the failure detection signal in a predetermined recording block section. If the accumulated value is greater than a predetermined threshold value, failure detection circuit 114 determines that the recording block has defectiveness with a significant impact and outputs a block-error determination signal.

A recording block is formed of frames. Failure detection memory 115 stores accumulated values of the failure-detection signal by frames. The accumulated values stored in failure detection memory 115, which correspond to the number of frames tracking back more-than-one turn of the track, are used by system controller 112 for checking defective condition.

1-2. Workings

Next, the workings of optical disk device 10 of the exemplary embodiment will be described.

First, the recording operation onto optical disk 100 by optical disk device 10 will be described.

I/F circuit 111 obtains recording data fed from host device 110 and a logical address to which the data is recorded on optical disk 100. Dividing the recording data into a predetermined recording block, I/F circuit 111 transmits, by recording blocks, the divided data to error-correction encoding circuit 106.

Error-correction encoding circuit 106 adds a parity code to the recording data divided by recording blocks so as to perform error correction in data reproducing. Receiving the recording data with the parity code, data modulation circuit 105 modulates it to a modulation signal based on a predetermined modulation rule.

Laser drive circuit 104 converts the modulation signal into a castle-type pulse waveform so as to precisely form a recording mark on optical disk 100, and outputs the pulse waveform to optical head 101 as a drive signal for driving the output of optical beams.

Optical head 101 emits an optical beam pulse corresponding to the drive signal to a position shown by a logical address of recording data on optical disk 100. This allows optical disk 100 to have a mark according to a modulation signal.

The aforementioned recording operation is controlled by system controller 112. According to the logical address of recording data obtained by I/F circuit 111, system controller 112 determines a recording position on optical disk 100, and controls servo controller 103 so as to move optical head 101 to a target position. Before optical head 101 reaches the track as the target position, system controller 112 drives error-correction encoding circuit 106, and upon arrival of optical head 101 at the target position, system controller 112 drives data modulation circuit 105 and laser drive circuit 104 so as to record data.

When optical disk 100 is in the normal condition having no problem, data is recorded by aforementioned recording operation. However, in the case of defective optical disk 100, data may not be recorded correctly onto an intended track section, or another data stored in the neighboring track may be overwritten by the data. Such an incorrect recording can adversely affect in reproducing the recording block, so that reliability of data-recording/reproducing will be seriously impaired. Therefore, if the number of errors correctable in error-correction decoding circuit 109 is almost occupied by unsuccessful recording cases described above, data is recorded on a different track section as alternative data-recording.

Figure 2:
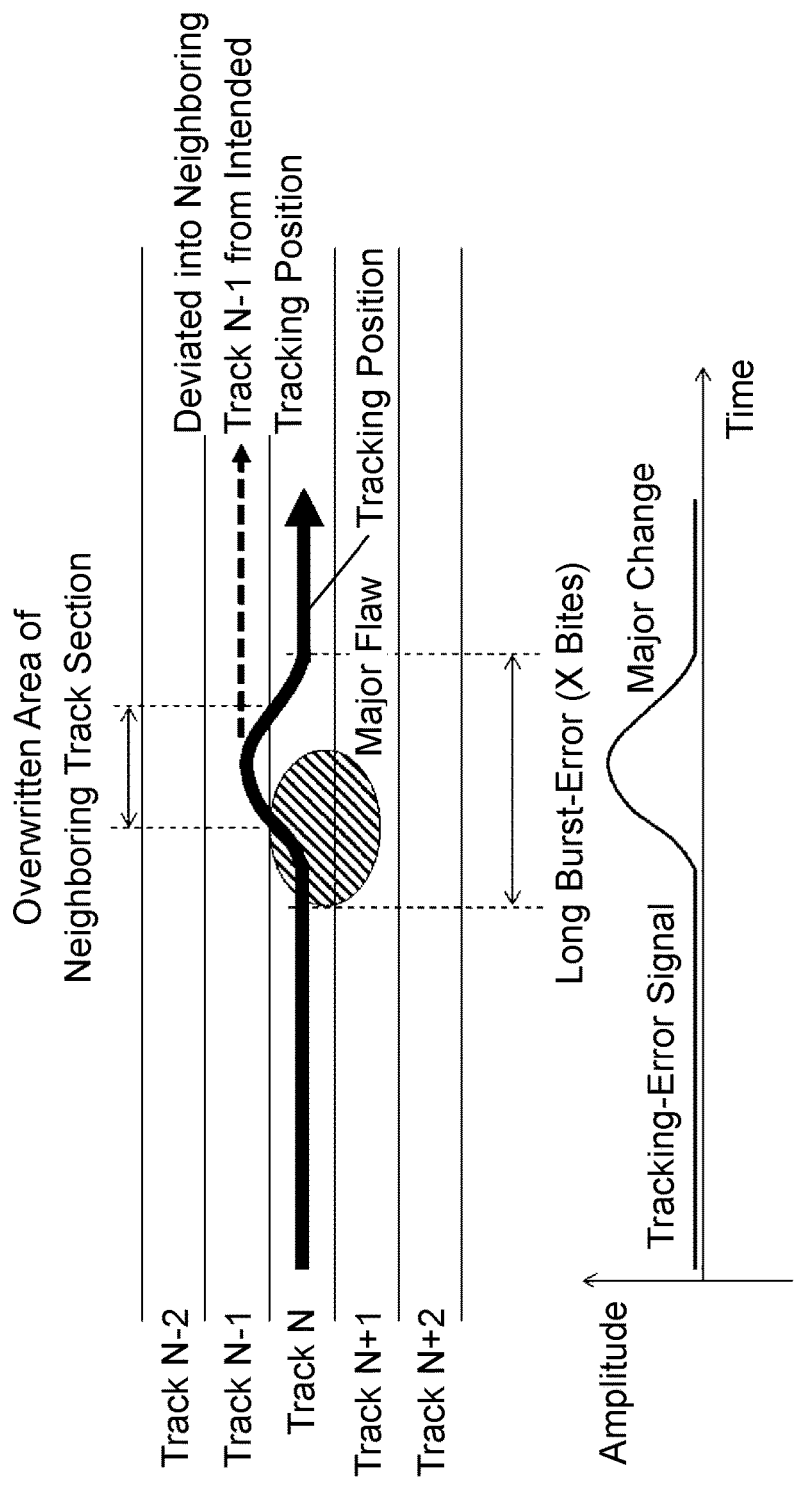
FIG. 2 shows the workings of the device affected by a major flaw on the disk.

FIG. 2 illustrates the tracking control by servo controller 103 when optical disk 100 has a major flaw on the track. When an optical beam comes in a major flaw of track N, the tracking-error signal is greatly affected by the flaw and the optical beam has a traveling route deviated from the center of track N. Therefore, track N has no successful data-recording between the position having the flaw and the position at which the optical beam comes back to the center of track N. Due to the deviation of the optical beam, data recorded on adjacent track N−1 may be overwritten by the data to be recorded on track N; in the worst case, the incorrect recording on track N−1 is performed over an extended area if the optical beam keeps scanning the center of track N−1 without returning to track N. As a result, both of track N and track N−1 have a prolonged burst error. If the number of errors goes beyond the correctable number of errors in error-correction decoding circuit 109, recorded data is no longer reproduced correctly.

To avoid such an unsuccessful data-reproducing, if a tracking-error signal has a change beyond a predetermined level, the device of the embodiment immediately stops data-recording operation. Further, after the recording operation, the device reproduces the data recorded on track N to check whether a serious burst error has occurred or not. If the number of errors equal to or greater than a predetermined number is detected, the device records data on a different track section as alternative recording.

Figure 3:
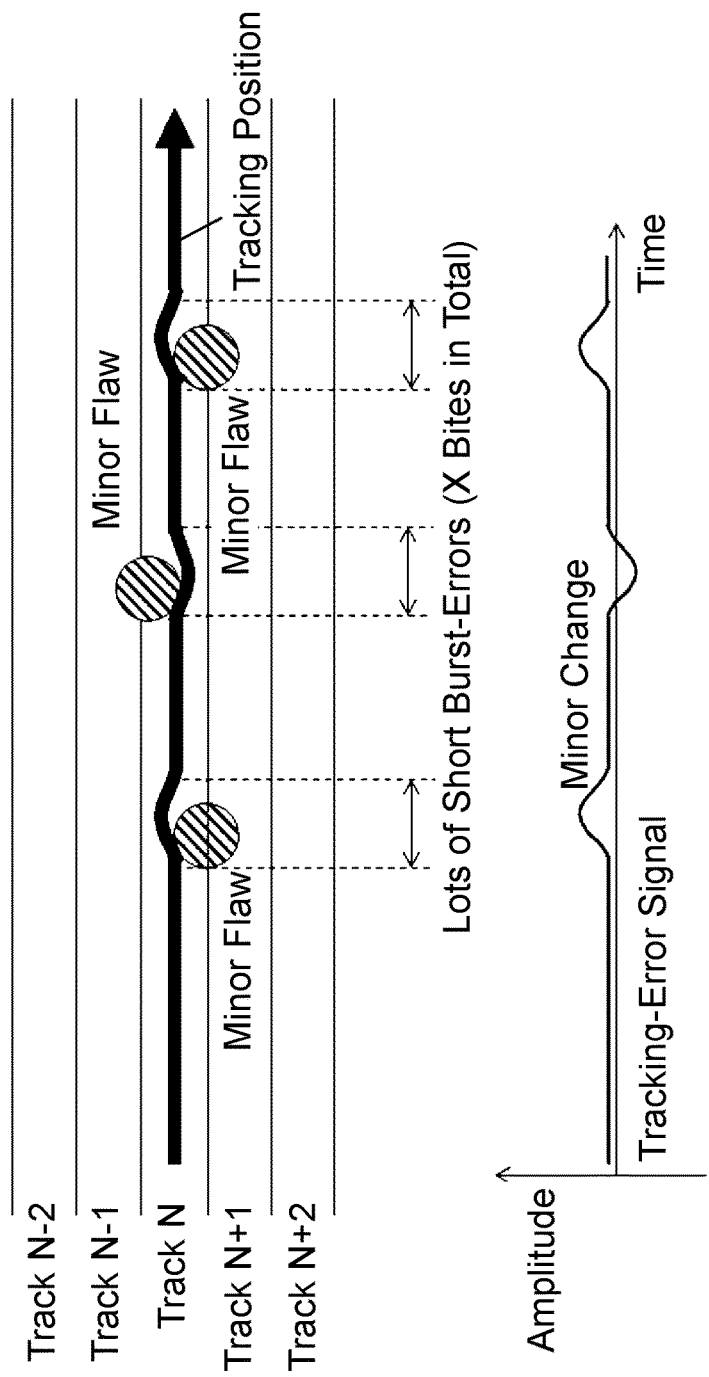
FIG. 3 shows the workings of the device affected by a plurality of minor flaws on the disk.

FIG. 3 illustrates the tracking control by servo controller 103 when optical disk 100 has a plurality of minor flaws on the track. In the case having minor flaws on the track, compared to the case having a major flaw shown in FIG. 2, the optical beam has no such a serious deviation by which data of an adjacent track is overwritten incorrectly. However, since data is not correctly recorded on each position with a minor flaw, lots of short burst-errors occur in data-reproducing operation. It may be all right when the minor errors are kept small in number; but increase in number of minor errors causes the problem similar to the case having a major flaw. That is, the sum of the number of short burst-errors can go beyond the number of errors correctable in error-correction decoding circuit 109.

When optical disk 100 has a major flaw shown in FIG. 2, a tracking-error signal has a significant change, which is enough for the device to determine that the data-recording operation has to be stopped. In the case having a plurality of minor flaws shown in FIG. 3, it becomes necessary to have an estimation whether or not the sum of the number of minor flaws in a recording block reaches the level equivalent to the number of errors in the case of a major flaw.

Figure 4:
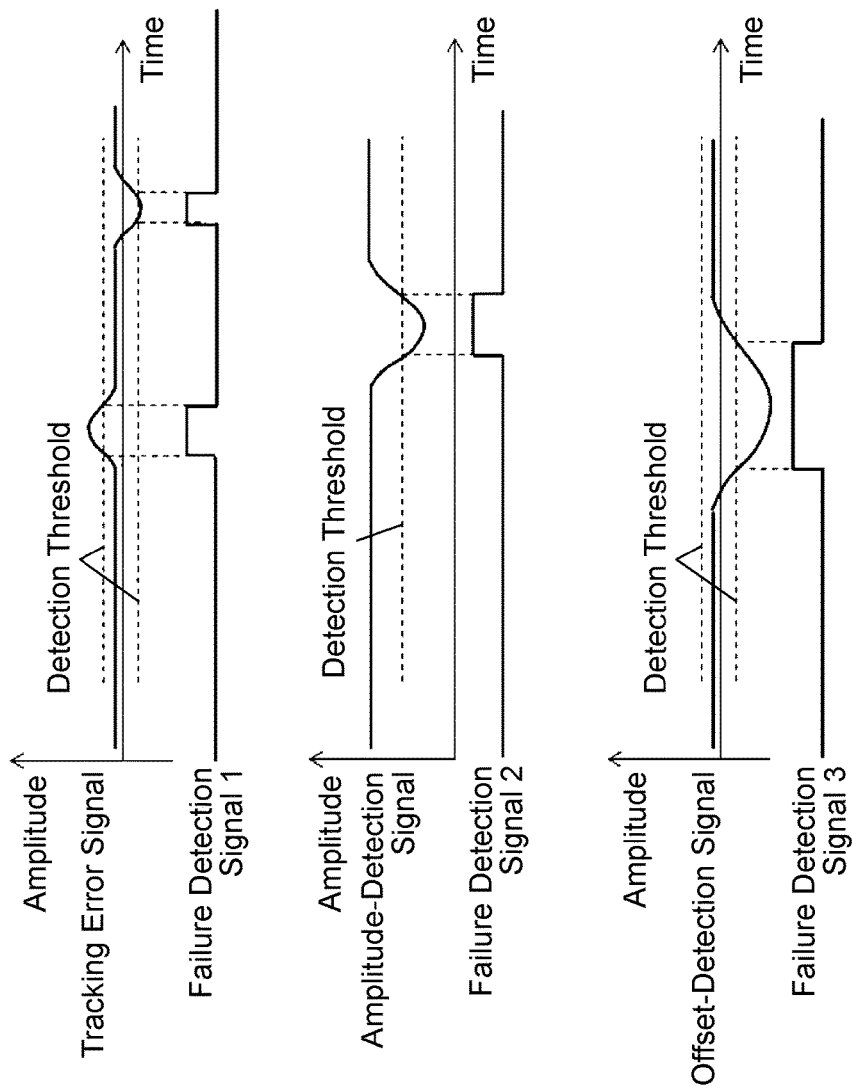
FIG. 4 illustrates the output operation of a failure detection circuit outputs when it outputs a failure detection signal.

A failure-state determining operation, which is also capable of dealing with the minor flaws above, will be described with reference to FIG. 4 and FIG. 5. The failure-state determining operation is performed by failure detection circuit 114.

In the data-recording operation, failure detection circuit 114 detects a failure state based on a tracking-error signal and a focus-error signal used for servo controller 103. As shown in FIG. 4, failure detection circuit 114 detects a failure state by making comparison between a detection threshold value and a period in which the tracking-error signal or the focus-error signal shows a big change upwardly or downwardly, and outputs a failure detection signal. The detection threshold value is defined at a level detectable any flaw—not only a major flaw shown in FIG. 2 but also minor flaws shown in FIG. 3—that causes unsuccessful data recording.

Figure 5:
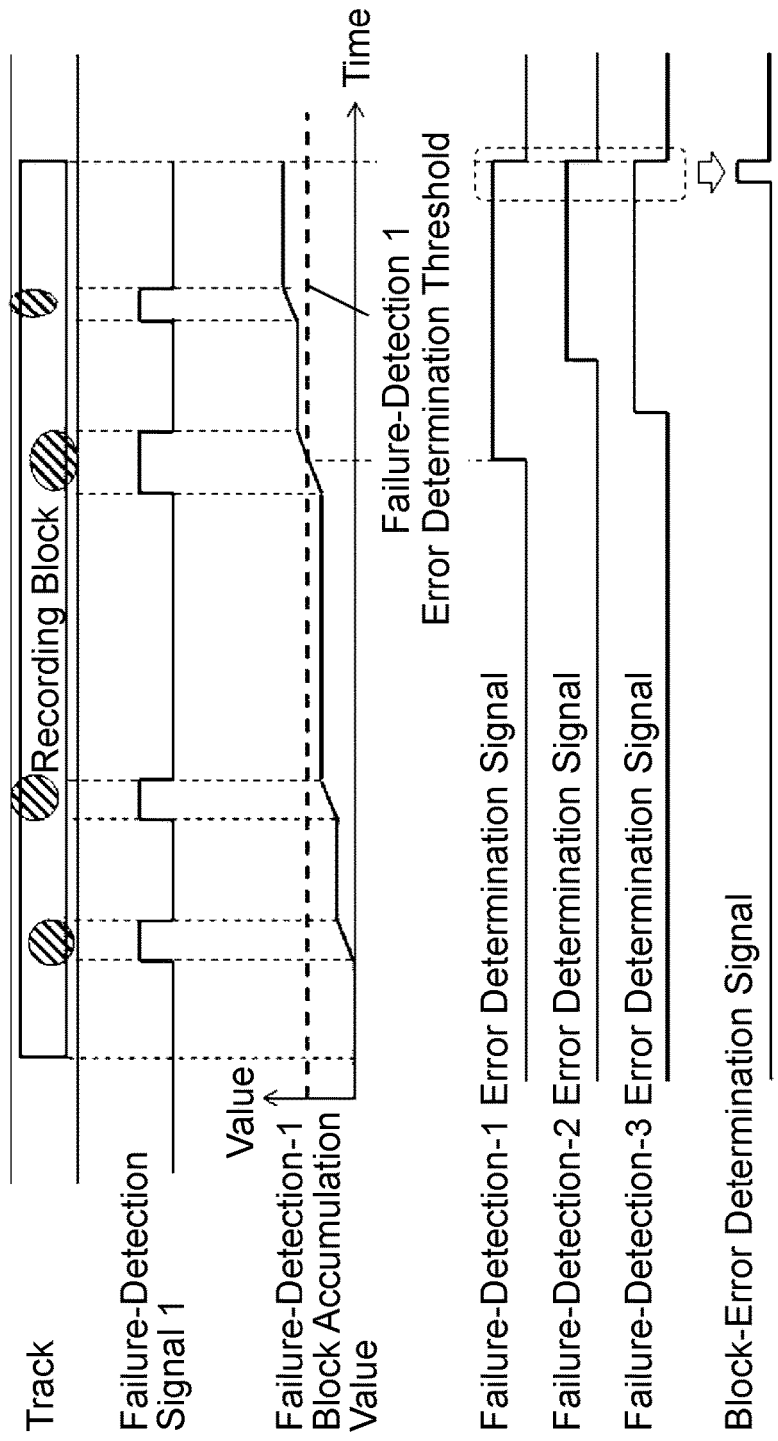
FIG. 5 illustrates the output operation of a failure detection circuit outputs when it outputs a block-error determination signal.

As shown in FIG. 5, failure detection circuit 114 accumulates a duration of output of the failure detection signal. The calculated value of duration is reset to zero at the start of a recording block and accumulated until the end of the recording block. failure detection circuit 114 makes comparison between the block accumulation value and a predetermined error determination threshold. If the accumulated value is greater than the threshold, failure detection circuit 114 outputs error determination signal.

According to a plurality of signals, such as a tracking-error signal and a focus-error signal, a plurality of failure detection signals, such as failure detection signal 1 and failure detection signal 2, is outputted. For each of the plurality of failure detection signals, an accumulated value of duration of signal output is calculated so as to obtain a plurality of block accumulation values, such as a failure-detection-1 block accumulation value (i.e., the accumulation value for failure detection signal 1) and a failure-detection-2 block accumulation value. Each of the plurality of block accumulation values is compared with respectively defined error-determination threshold. If each block-accumulation value is greater than the threshold defined for the value, a plurality of error determination signals, such as a failure-detection-1 error determination signal and a failure-detection-2 error determination signal, is outputted. If detecting output of any or all of the error determination signals, failure detection circuit 114 finally determines that the currently processing recording-block is defective due to a large amount of summed-up flaws, and outputs a block-error determination signal to data modulation circuit 105 and system controller 112. At that time, to keep the correctable number of errors used for data-reproducing in error-correction decoding circuit 109 so as not to be "eaten up" by the large amount of summed-up flaws in the recording block, the data recorded on the recording block is recorded again on a different track section as alternative recording. To perform the alternative recording, data modulation circuit 105 stops the recording operation at the end of the recording block, and system controller 112 controls the recording operation so as to move to a different track section and record data on there.

The number of errors correctable in data-reproducing contains the two types of errors: one is a burst error caused by variation in tracking or focusing due to a flaw or dust on a disk; and the other is a random error caused by variation in recording quality. Error-correction decoding circuit 109 has to correct all of the burst errors and the random errors. For a track having no burst error, error-correction decoding circuit 109 can use the correctable number of errors for the random error only; whereas, for a track having a burst error, the rest of the correctable number—after removing the number used for the burst error—can be used for correcting the random error.

In a long-term storage of optical disk 100, occurrence of an error increases due to dust collected on the disk and aging degradation. Taking it into consideration, immediately after data-recording operation, the number of errors is checked by reproducing the data. If the number of errors is equal to or greater than a predetermined level, the data is recorded again on a different track section. In the process above, the checking operation for the number of errors needs time for reproducing data, which slows down the transfer speed. However, optical disk device 100 of the exemplary embodiment detects, while recording data, the total number of flaws on a disk that will be a serious impact on the number of errors in a recording block in the data-reproducing operation. In this way, the device quickly performs alternative data-recording without data-reproducing.

FIG. 6 illustrates how failure detection memory 115 stores a time-accumulated value of each failure detection signal calculated by failure detection circuit 114. Failure detection circuit 114 not only calculates the block accumulation value from the start to the end of a recording block shown in FIG. 5 but also calculates, as shown in FIG. 6, the frame accumulation value for each frame as a unit divided from a recording block. Receiving the frame accumulation value calculated for each failure detection signal, failure detection memory 115 stores them in sequence. Failure detection memory 115 has a memory capacity enough for storing the frame accumulation values for the recording blocks corresponding to more-than-one turn of the track.

In response to the output of a block-error determination signal from failure detection circuit 114, system controller 112 performs alternative data-recording; at the same time, it checks the condition of a flaw on optical disk 100, based on the frame accumulation values stored in failure detection memory 115. If a flaw extends over a plurality of frames or extends to an area corresponding to a one-turn-behind frame, system controller 112 determines that the flaw will seriously impact on the number of errors in data-reproducing. In that case, system controller 112 may determine that the neighboring track sections are also affected by the flaw, and perform alternative data-recording with data to be recorded on the neighboring section included together. Further, when the neighboring track section already has data, system controller 112 may reproduce the data to check whether it is overwritten data or not. System controller 112 may thus perform alternative data-recording according to the state of neighboring track section.

Next, the data-reproducing operation of optical disk device 10 of the embodiment will be described. In data-reproducing operation, optical disk device 10 determines the position of optical disk 100 from which data is reproduced in a manner similar to determining position from which data is recorded in data-recording operation. When optical head 101 reaches a position of a recording block to be reproduced, system controller 112 controls reproducing-signal decoding circuit 107, data demodulation circuit 108, and error-correction decoding circuit 109 so as to reproduce data.

Reproducing-signal decoding circuit 107 makes comparison between the reproducing signal and an expectation-value waveform and selects the waveform whose shape is most similar to the reproducing signal. Reproducing-signal decoding circuit 107 outputs a binary signal, which is the base of the expectation-value waveform, as the decoding signal. Data demodulation circuit 108 demodulates a demodulation signal according to a predetermined demodulation rule to obtain recording data. Error-correction decoding circuit 109 provides the decoded recording data with error correction and correctly restores recording data, and after that, error-correction decoding circuit 109 transmits the data to host device 110 via I/F circuit 111.

Failure detection circuit 114 and failure detection memory 115 work in a similar manner to that in data-recording. In the data-reproducing operation, as shown in FIG. 4, an amplitude-detection signal and an offset-detection signal of data-reproducing signals based on the data recorded on the track are used for failure detection. In the flaw-free area on the track, the amplitude-detection signal and the offset-detection signal, as is the same with the tracking-error signal and a focus-error signal, have a constant value with no change. However, in an area having a flaw, the reflection rate of the optical beam lowers due to the flaw and the amount of reflection beams lowers due to the off-center tracking and focusing, by which the reproducing signal has a decreased amplitude and has variations in offset. Accordingly, the amplitude-detection signal and the offset-detection signal have a value with significant change. As described earlier, the amplitude-detection signal and the offset-detection signal have respective detection threshold values. If the signals have a value beyond or below the respective threshold, a failure detection signal is outputted.

The output operation of a block-error determination signal for each recording block based on the failure detection signal described above is similar to the data-recording operation, as shown in FIG. 5. If a block accumulation value calculated for each recording block is greater than an error determination threshold, an error determination signal is outputted, and a block-error determination signal is outputted based on a plurality of error determination signals. Further, a duration of output of the failure detection signal is calculated for each frame and the calculated value is stored in failure detection memory 115—this is the same as the recording operation shown in FIG. 6.

As described in the recording operation above, by detecting a flaw in data recording and performing alternative data-recording, the device assures that there is a burst error less than a predetermined level just after the data-recording operation. As described earlier, in a long-term storage of optical disk 100, occurrence of an error increases due to dust collected on the disk and aging degradation. However, in data reproducing, failure detection circuit 114 and failure detection memory 115 check the state of optical disk 100 for a change from the state in data recording.

Defining two types of detection threshold values for an amplitude detection signal of the reproducing signal allows the device to determine difference in the state of flaw and to separately output a failure detection signal. Specifically, when detecting a section with the amplitude completely lost, the device determines that the section has a flaw formed earlier than the data-recording operation and therefore the section has no record. When detecting a section with the amplitude reduced to around the half, the device determines that the section has a flaw caused by, for example, dust attached after the data-recording operation. In a recording block, if the block accumulation value of a failure detection signal outputted for the section with the amplitude reduced to the half becomes equal to or greater than a predetermined error determination threshold, the device determines a high probability of increase in occurrence of burst errors due to dust that will attach on the disk in the storage period ahead. To ensure reliability in long-storage data, the device records the data of the recording block on a different track section as alternative recording or copies the data to a different optical disk.

If the device has correction failure that is uncorrectable in error-correction decoding circuit 109, the device can reproduce the data again by optimizing reproducing conditions based on the result of the recording block stored in failure detection memory 115. Specifically, based on the result stored in failure detection memory 115, the device locates a defective area where incorrect focusing and tracking is observed. In the second-time operation of data reproducing, the device performs focusing and tracking with response gain lowered, or held, so as to minimize the impact from the defective area on optical disk 100.

Besides, if the device locates a defective area where the amplitude or offset of a reproducing signal is affected by defectiveness, the device lowers or holds the response gain of a filter contained in reproducing-signal decoding circuit 107 so that optical beams have a quick return to the normal condition after passing the defective area.

In the case where not so much failure detection signals are detected, the device determines that the state is affected by poor reproducing condition on average, not by a suddenly occurred flaw. To improve the condition, the device appropriately changes control condition of focusing and tracking in servo controller 103, or temporarily increases the reproducing power of optical beam emitted from optical head 101. In this way, with the reproducing condition appropriately improved, the device reproduces data again. The improvement in reproducing conditions decreases the number of errors to a level correctable in error-correction decoding circuit 109.

As described above, optical disk device 10 monitors the condition of optical disk 100 while performing data-recording and data-reproducing. Further, when the system has a structure where a plurality of optical disk devices 10 and a server are employed, data can be stored so as to have higher reliability selectively between different optical disks 100 and optical disk devices 10, by which alternative data-recording is performed with efficiency.

To know an increasing tendency of defectiveness, optical disk devices 10 are classified into groups by difference in time of beginning of use and difference in installation site. For each group, a result of failure detection obtained in data-recording/reproducing is stored and organized—for example, a flaw in an early state or a flaw with increasing tendency—in the server. Such a large amount of data shows the condition of optical disks 100 by difference in operating time and location; for example, the early state or tendency of deterioration with age of optical disks 100 produced around the same time, and tendency of increase in flaws of optical disks 100 used in the same location.

Based on the tendency information, the server performs operation and maintenance control on data. For example, as for the data retained under a condition that can increase the number of errors in the data-reproducing operation, the server moves the data to another optical disk device 10 in a good condition, or copies the data to apply a higher redundancy. Further, when the increasing tendency of flaws is mainly affected by dust, the cleaning process on optical disks 100 may be an effective prevention against the problem of the number of errors beyond the level that is uncorrectable in error-correction decoding circuit 109. As descried above, with reference to a large amount of data on various states of the disks, the device can quickly check the storage condition of optical disks 100 retained under the same condition, with no need for actually reproducing data recorded on all of optical disks 100. This contributes to long-term data storage with high reliability and a minimized cost.

1-3. Effect

As described above, optical disk device 10 of the exemplary embodiment performs the data-recording/reproducing operations on the track of optical disk 100.

Optical disk device 10 has a recording-signal generation section (formed of an error-correction encoding circuit, a data-modulation circuit, and a laser drive circuit), an optical head, and a failure-detection circuit. The recording-signal generation section generates a recording signal by data modulation. The optical head records data, according to the recording signal, to the track by optical beam emission, and detects light reflected off the track and then generates a detection signal based on the reflected light. The failure-detection circuit detects an abnormal condition based on the detection signal changed from a normal condition. If the sum of the time during which the abnormal condition is kept in the recording block is equal to or greater than the first time-length, the failure-detection circuit determines that the recording block has a flaw.

Optical disk device 10 of the present disclosure further contains failure detection memory. The sum of duration of the abnormal condition is kept in a frame is calculated by the failure detection circuit. The failure detection memory sequentially stores the sum duration of the abnormal condition by the frame, tracking back from the current position on the track over a period of the past more-than-one turn of the track.

With the structure above, the device detects an impact of a flaw on optical disk 100, without reproducing for check immediately after the data-recording operation. Compared to a conventional structure, optical disk device 10 shortens the time required for data recording by half. Besides, the device retains a large amount of results of flaw-detection collected during the data-reproducing operation. Therefore, with no need for checking all the data by reproducing, with reference to prediction results of increasing tendency of the number of errors, the device performs alternative data-recording on the data potentially affected by a flaw. As a result, the device provides data storage with high efficiency and reliability.

Other Exemplary Embodiments

The exemplary embodiment has been described as an example of technique of the present disclosure. However, the technique of the present disclosure is not limited to the structure described above but is applicable exemplary embodiments with various changes, replacement, addition, and omission. Further, a newly exemplary embodiment can be structured by combining the components described in the embodiment above.

In addition to a component essential for solving problems, the accompanying drawings and the in-detail description can contain a component used for illustrative purpose in the technique but not essential for solving problems. It will be understood that not all the components described in the drawings and description are essential for solving problems.

INDUSTRIAL APPLICABILITY

The structure of the present disclosure is applicable to an optical disk device that performs data-recording/reproducing on an optical disk.

REFERENCE MARKS IN THE DRAWINGS

10: optical disk device
100: optical disk
101: optical head
102: spindle motor
103: servo controller
104: laser drive circuit
105: data modulation circuit
106: error-correction encoding circuit
107: reproducing-signal decoding circuit
108: data demodulation circuit
109: error-correction decoding circuit
110: host device
111: interface (I/F) circuit
112: system controller
113: ROM
114: failure detection circuit
115: failure detection memory

What is claimed is:

1. An optical disk device that performs data-recording and data-reproducing on a track of an optical disk by a predetermined recording block, the optical disk device comprising:
   a recording unit that generates a recording signal by modulating data;
   an optical-head that performs data-recording by emitting optical beams to the track according to the recording signal, and detects light reflected off the track and then generates a detection signal based on the reflected light; and
   a failure detection unit that detects an abnormal condition based on the detection signal changed from a normal condition of the detection signal, and determines that a recording block has a flaw if a sum of duration of the abnormal condition in the recording block is equal to or greater than a first time-length.

2. The optical disk device according to claim 1, wherein the recording unit includes:
   an error-correction encoding unit to encode the data by the recording block into a predetermined error-correction encoding format, and
   a modulating unit to modulate the encoded data into the recording signal.

3. The optical disk device according to claim 2, wherein the first time-length defined in the failure detection unit is shorter than a time length corresponding to a number of errors correctable by the error-correction encoding format.

4. The optical disk device according to claim 1 further comprising:
   a servo unit to control the optical head so that emission of the optical beams is focused on a center position of the track by detecting a focus-error signal and a tracking-error signal from the detection signal,
   wherein, the failure detection unit detects an abnormal condition based on a change from a normal condition of at least any one of the focus-error signal and the tracking-error signal.

5. The optical disk device according to claim 2 further comprising:
   a reproducing unit to: generate a reproducing signal by detecting the recording signal recorded in the track from the detection signal generated by the optical-head; demodulate the reproducing signal; and decode the data from a result of the modulation according to the error-correction encoding format,
   wherein, the failure detection unit detects an abnormal condition based on a change from a normal condition of the reproducing signal.

6. The optical disk device according to claim 1, wherein, in response to determination of the failure detection unit that the recording block has a flaw, the recording unit stops generating the recording signal at an end of the recording block.

7. The optical disk device according to claim 1 further comprising:
   a control unit to control recording and reproducing operations on the data on the track,
   wherein, in the data-recording operation, when the failure detection unit determines that the recording block has a flaw, the control unit controls operation so that the data is recorded again on a recording block different from the flaw-detected recording block.

8. The optical disk device according to claim 5 further comprising:
   a control unit to control recording and reproducing operations on the data on the track,
   wherein, in the data-reproducing operation, when the failure detection unit determines that the recording block has a flaw, the control unit controls operation so that the data decoded by the reproducing unit is recorded on a recording block different from the flaw-detected recording block.

9. The optical disk device according to claim 7, wherein the recording block is formed of a plurality of frames, the failure detection unit calculates a sum of duration of an abnormal condition in each of the frames,
   the optical disk device further comprising:
      a failure detection memory that sequentially stores the sum of the duration of the abnormal condition in each of the frames, tracking back from a current position over a period of a past more-than-one turn of the track,
   wherein, in the data-recording operation, if the failure detection unit determines that the recording block has a flaw and if the control unit determines that, with reference to values stored in the failure detection memory, the flaw existing on the recording block and a neighboring recording block that corresponds to a position of one-turn tracking back from the flaw-detected recording block extends larger than a predetermined number of frames, the control unit further controls operation so that the data to be recorded on a one-turn-ahead recording block successive to the flaw-detected recording block is recorded again on a different recording block.

10. The optical disk device according to claim 7, wherein the recording block is formed of a plurality of frames, the failure detection unit calculates a sum of duration of an abnormal condition in each of the frames, the optical disk device further comprising:
a failure detection memory that sequentially stores the sum of the duration of an abnormal condition in the frame, tracking back from a current position over a period of a past more-than-one turn of the track,
wherein, in the data-reproducing operation, if the failure detection unit determines that the recording block has a flaw and if the control unit determines that, with reference to values stored in the failure detection memory, the flaw existing on the recording block and a neighboring recording block that corresponds to a position of one-turn tracking back from the flaw-detected recording block extends larger than a predetermined number of frames, the control unit further controls operation so that the data recorded at least in a range between the flaw-detected recording block and a recording block corresponding to the position of one-turn tracking back from the flaw-detected recording block is recorded again on a different recording block.

11. A large-scale optical disk device comprising:
a plurality of the optical disk devices according to claim 1;
a control unit to control the plurality of optical disk devices; and
an organizing unit to store detection results obtained by the failure detection unit of each of the optical disk devices,
wherein, in response to determination of the failure detection unit of a first optical disk device that the recording block has a flaw, when the detection results of the organizing unit shows that a second optical disk device includes fewer detected flaws in number than the first optical disk device, the control unit moves the data of the flaw-detected recording block of the first optical disk device to the second optical disk device.

* * * * *